United States Patent [19]

Meyer et al.

[11] Patent Number: 4,776,870
[45] Date of Patent: Oct. 11, 1988

[54] METHOD FOR IMPROVING EMMISSIVITY VALUE OF A PYROLYTICALLY APPLIED FILM

[75] Inventors: John H. Meyer, Milford; Narayandas Malani, Grosse Ile, both of Mich.

[73] Assignee: Ford Motor Company, Dearborn, Mich.

[21] Appl. No.: 762,744

[22] Filed: Aug. 5, 1985

[51] Int. Cl.$^4$ .............................................. C03C 17/28
[52] U.S. Cl. .................................... 65/60.52; 65/30.1; 427/160; 427/165
[58] Field of Search ............................ 65/30.1, 60.52; 427/160, 165

[56] References Cited

U.S. PATENT DOCUMENTS

| | | | |
|---|---|---|---|
| 3,679,386 | 7/1972 | Kushihashi et al. | 65/60.52 |
| 3,984,591 | 10/1976 | Plumat et al. | 65/60.52 |
| 4,349,369 | 9/1982 | Laethem et al. | 65/60.52 |
| 4,393,098 | 7/1983 | Stinson et al. | 65/60.52 |
| 4,590,096 | 5/1986 | Lindner | 65/60.52 |
| 4,612,217 | 9/1986 | Gordon | 427/165 |

FOREIGN PATENT DOCUMENTS

| | | | |
|---|---|---|---|
| 0041010 | 12/1981 | European Pat. Off. | 65/60.52 |
| 0112780 | 7/1984 | European Pat. Off. | 65/60.52 |

*Primary Examiner*—Arthur Kellogg
*Attorney, Agent, or Firm*—William E. Johnson; Clifford L. Sadler

[57] ABSTRACT

This specification is directed to a method for improving emmissivity value of a pyrolytically applied doped tin oxide film on a surface of a glass substrate, such as a sheet of glass. The method includes the steps of heating the surface of the glass substrate to an initial temperature in a range from 560°–650° C. and thereafter applying to the surface of the glass substrate a doped tin oxide film by a pyrolytic decomposition process. The pyrolytic decomposition process is one which cools the surface of the glass substrate. The surface of the glass substrate is reheated to a temperature equal to or greater than the initial temperature but not in excess of 675° C. Thereafter, a doped tin oxide film is applied to the previously coated surface of the glass substrate. The reheating and application steps may be repeated as many times as desired to produce a coated glass substrate having the desired coating thickness and emmissivity characteristics.

6 Claims, No Drawings

METHOD FOR IMPROVING EMMISSIVITY VALUE OF A PYROLYTICALLY APPLIED FILM

TECHNICAL FIELD

This application is directed to a method for improving emmissivity value of a pyrolytically applied doped tin oxide film on the surface of a glass substrate. The lower the emmissivity value of the applied film, the better the glass substrate operates to reflect infrared radiation which thereby enhances the insulating value (lower heat transportation) of that glass in applications such as window glazing for homes.

BACKGROUND AND PRIOR ART STATEMENT

There is available on the market today glass substrates, such as large glass windows, which have a pyrolytically applied doped tin oxide film thereon. The purpose of the pyrolytically applied doped tin oxide film is to improve the emmissivity value of the glass substrate over that emmissivity value which it has without the coating thereon. Normally the emmissivity value of the glass sheet is reduced by the application of the doped tin oxide film. A normal glass sheet having a thickness of one-eighth of an inch has an emmissivity value of 0.84, whereas such a glass sheet coated with a pyrolytically applied doped tin oxide film would have an emmissivity value in a range of about 0.50 to 0.35.

The lower the emmissivity value, the better the coated glass sheet is in reflecting infrared radiation. For example, if such a coated glass sheet is glazed into a window with the coating facing the interior of the building, the coating is effective in reflecting back into the building the infrared radiation produced within the building as, for example, by means of a fuel burning furnace. Most of such radiation would normally pass through an uncoated window but will have a large proportion thereof reflected back into the building by a properly coated glass window. Our invention teaches a way of obtaining an even greater reduction of the emmissivity value of a pyrolytically applied doped tin oxide film on the surface of a glass substrate such as a glass window glazing. The method of our invention achieves substantial improvements in the emmissivity value, that is, a lowering of the emmissivity value over structures which are generated not using the method of our invention.

DISCLOSURE OF INVENTION

This invention is directed to a method for improving emmissivity value of a film on a surface of a glass substrate and, more particularly, to a method for improving emmissivity value of a pyrolytically applied doped tin oxide film on a surface of a glass substrate.

In accordance with the general teachings of the method of our invention, the method has the following steps. The surface of the glass substrate is heated to an initial temperature in a range from 560°–650° C. This temperature range is approximately 1040°–1200° F. A doped tin oxide film is applied to the surface of the glass substrate by a pyrolytic decomposition process. During the application of the film, the surface of the glass substrate cools.

In accordance with teaching of the method of our invention, the surface of the glass substrate is reheated to a temperature equal to or greater than the initial temperature but not in excess of 675° C., which is approximately 1250° F. A doped tin oxide film is then applied to the previously coated surface of the glass substrate by a pyrolytic decomposition process.

The resulting glass substrate has a lower emmissivity value than would be generated if all of the doped tin oxide film was applied in a single pyrolytic application process.

The method of our invention envisions at least one reheating of the surface of the glass substrate with a pyrolytic decomposition process being carried out after the reheating in order to apply a doped tin oxide film thereon. The critical part about the reheating is that in order to get the benefits of the method, the reheating should be to a temperature equal to or greater than the temperature to which the glass substrate was initially heated. If desired, the glass substrate may be reheated and coated a plurality of times rather than simply once. In fact, we have achieved emmissity values as low as 0.15 where repeated reheating and coating steps were carried out on a single glass substrate. If a plurality of coating operations are carried out, the criticality lies in having the last coating operation carried out after the surface of the glass substrate has been reheated to a temperature equal to or greater than the initial temperature to which that glass substrate had been heated.

BEST MODE AND INDUSTRIAL APPLICABILITY

The novel features that are considered characteristic of the method of our invention are set forth with particularity in the appended claims. The method of the invention itself, however, both as to its organization and its manner of operation, together with additional objects and advantages thereof, will best be understood from the following description of specific embodiments.

The following description also sets forth what we consider to be preferred embodiments of the method for improving emmissivity value of a pyrolytically applied doped tin oxide film on a surface of a glass substrate. The following description also sets forth what we now contemplate to be the best mode of carrying out our method. This description, however, is not intended to be a limitation upon the broader principles of the method of our invention and while preferred materials are used in disclosing such preferred embodiments in accordance with the requirements of the laws, it does not mean than other materials cannot be used in carrying out the method of our invention.

All of the examples disclosed below were prepared in the same manner with the exception being the temperatures to which the individual glass panels were heated and the number of times they were subjected to a spraying operation.

The testing procedure is one in which 24"×24" heated glass panels having a thickness of 7/32" were heated for six minutes in a heating oven set at the appropriate temperature. A DeVilbiss AGB automatic spray gun mounted on a reciprocator was used to spray dibutyl-tindiacetate which was fluorine doped and dissolved in methanol onto the glass panels for the number of cycles set forth in each example.

EXAMPLE 1

A glass panel was heated to a temperature of 1080° F. (582° C.) and then subjected to a single application of the coating material passing back and forth over the heated panel of glass for 20 cycles. This sample had an emmissivity value of 0.53.

EXAMPLE 2

The process of Example 1 was repeated, but the glass panel was heated to a temperature of 1130° F. (610° C.). The emmissivity value of this sample was 0.41.

EXAMPLE 3

The procedure of Example 1 was repeated, except that the glass panel was heated to a temperature of 1150° F. (621° C.). The so-prepared sample had an emmissivity value of 0.35.

EXAMPLE 4

The procedure of Example 1 was repeated, except that after 10 passes of the coating material, the glass panel was reheated to 1080° F. before the final 10 passes of coating material were applied thereto. In this case the emmissivity value of the glass panel was 0.35 as compared to 0.53 of Example 1, a substantial reduction. In both cases the film thickness was 520 nm.

EXAMPLE 5

The double coating procedure of Example 4 was repeated with the exception that the initial temperature and the temperature to which the panel was reheated after 10 passes of the coating material was 1130° F. In this case the emmissivity value was 0.30 as compared to 0.41 which was achieved in Example 2. In both cases the coating thickness was 520 nm. Once again, a substantial reduction was achieved because the substrate was reheated during the coating process.

EXAMPLE 6

The procedure of Example 4 was once again repeated on a glass panel which had been initially heated to and then reheated to 1150° F. In this case the emmissivity value was 0.24, once again a substantial reduction from 0.35 achieved in Example 3 for the same film thickness of 520 nm. It is also interesting to note that lower emmissivity values were obtained using higher coating temperatures. However, the glass temperature should not exceed about 1250° F. (677° C.).

EXAMPLE 7

In this example, the process of Example 4 was repeated except that the film thickness developed was 600 nm and the initial and reheat temperatures each were 1150° F. (621° C.). In this case the emmissivity value was 0.25.

EXAMPLE 8

The procedure of Example 7 was repeated to develop the same film thickness. The initial temperature and reheat temperature of the glass panel was 1130° F. (610° C.). Under these conditions, the resulting coated glass had an emmissivity value of 0.30.

EXAMPLE 9

The procedure of Example 7 was repeated except that the initial temperature to which the glass substrate was heated was 1080° F. (582° C.) and the reheat temperature was 1130° F. (610° C.). In this case the resulting coated glass panel had an emmissivity value of 0.27.

EXAMPLE 10

The procedure of Example 7 was repeated except that the initial and reheat temperatures used were 1080° F. (582° C.). In this case the coated glass panel had an emmissivity value of 0.36.

EXAMPLE 11

The procedure of Example 7 was repeated except that the intial temperature was 1130° F. (610° C.) and the reheat temperature was a cooler 1080° F. (582° C.). In this case the resulting glass panel had an emmissivity value of 0.40.

In view of the teachings of Examples 7 through 11, it may be concluded once again that the higher the temperature to which the glass is heated, the better emmissivity value obtained on a glass substrate coated after being reheated. Example 11 also indicates that if the second reheat temperature is lower than the initial temperature, the emmissivity is degraded. For example, if one compares the emmissivity values of that obtained in Example 11 to that obtained in Example 8, it is seen that there is a significant degradation of the emmissivity value when the reheat temperature was 50° F. below the intial temperature.

While particular embodiments of our invention have been illustrated and described, it will be obvious to those skilled in the art that various changes and modifications may be made without departing from the invention and it is intended to cover in the appended claims all such modifications and equivalents as fall within the true spirit and scope of the method of our invention. For example, one could use doped monobutyl tin trichloride as the material to develop the doped tin oxide film on the glass substrate.

We claim:

1. A method for improving emmissivity value of a pyrolytically applied doped tin oxide film on a surface of a glass substrate, which method comprises the steps of:

heating said surface of said glass substrate to an initial temperature in a range from 560°–650° C.;

applying to said surface of said glass substrate a doped tin oxide film by a pyrolytic decomposition process, which process cools said surface of said glass substrate;

reheating said surface of said glass substrate to a temperature equal to or greater than said initial temperature but not in excess of 675° C.; and applying to said previously coated surface of said glass substrate a doped tin oxide film by a pyrolytic decomposition process.

2. The method of claim 1, in which a doped dibutyltindiacetate is the material used to pyrolytically apply the doped tin oxide film.

3. The method of claim 1, in which a doped monobutyl tin trichloride is the material used to pyrolytically apply the doped tin oxide film.

4. A method for improving emmissivity value of a pyrolytically applied doped tin oxide film on a surface of a glass substrate, which method comprises the steps of:

heating said surface of said glass substrate to an initial temperature in a range from 560°–650° C.;

applying to said surface of said glass substrate a doped tin oxide film by a pyrolytic decomposition process, which process cools said surface of said glass substrate;

reheating said surface of said glass sheet to a temperature equal to or greater than said initial temperature but not in excess of 675° C.;

applying to said previously coated surface of said glass substrate a doped tin oxide film by a pyrolytic decomposition process, which process cools said surface of said glass substrate; and repeating said reheating and application steps to develop a final doped tin oxide film on said surface of said glass substrate having the desired thickness and emmissivity characteristics required.

5. The method of claim 4, in which a doped dibutyltindiacetate is the material used to pyrolytically apply the doped tin oxide film.

6. The method of claim 4, in which a doped monobutyl tin trichloride is the material used to pyrolytically apply the doped tin oxide film.

* * * * *